United States Patent
Moore et al.

(10) Patent No.: US 9,170,634 B2
(45) Date of Patent: Oct. 27, 2015

(54) POWER MANAGEMENT MODULE FOR USB DEVICES

(75) Inventors: Terrill M. Moore, Trumansburg, NY (US); Mats Webjorn, Spanga (SE); Chae Hee Won, Ithaca, NY (US); Flaviu Cristian Chis, Austin, TX (US)

(73) Assignee: MCCI Corporation, Ithaca, NY (US)

( * ) Notice: Subject to any disclaimer, the term of this patent is extended or adjusted under 35 U.S.C. 154(b) by 574 days.

(21) Appl. No.: 13/537,920

(22) Filed: Jun. 29, 2012

(65) Prior Publication Data

US 2013/0007324 A1    Jan. 3, 2013

Related U.S. Application Data

(60) Provisional application No. 61/503,349, filed on Jun. 30, 2011.

(51) Int. Cl.
*G06F 1/32*    (2006.01)

(52) U.S. Cl.
CPC .............. *G06F 1/3215* (2013.01); *G06F 1/325* (2013.01)

(58) Field of Classification Search
CPC ................................ G06F 1/325; G06F 1/3215
USPC ............................................ 710/200; 713/324
See application file for complete search history.

(56) References Cited

U.S. PATENT DOCUMENTS

| | | | |
|---|---|---|---|
| 6,292,860 B1 | 9/2001 | Cochcroft | |
| 2009/0094400 A1 | 4/2009 | Scales | |
| 2009/0199031 A1 | 8/2009 | Zhang et al. | |
| 2009/0254771 A1* | 10/2009 | So et al. | 713/323 |
| 2010/0049881 A1 | 2/2010 | Manor et al. | |
| 2011/0173351 A1* | 7/2011 | Aull et al. | 710/8 |
| 2013/0145186 A1* | 6/2013 | Chu et al. | 713/310 |
| 2013/0198548 A1* | 8/2013 | No et al. | 713/323 |

\* cited by examiner

*Primary Examiner* — Nimesh G Patel
(74) *Attorney, Agent, or Firm* — Cesari and McKenna, LLP

(57) ABSTRACT

A system and method of managing power of a multi-function USB device suspends the device in response to receipt of a request to suspend from a USB host; assigns respective device functions to indefinite, locked or unlocked states; allows the device to resume if there are data or requests for host attention pending at a given function that is in the unlocked state and assigning the given function to the locked state; and otherwise maintains the suspend even if there are data are pending at one or more functions that are in the locked state.

21 Claims, 3 Drawing Sheets

POWER MANAGEMENT MODULE FOR USB DEVICES

CROSS-REFERENCE TO RELATED APPLICATIONS

The present application claims the benefit of U.S. Provisional Patent Application Ser. No. 61/503,349, which was filed on Jun. 30, 2011, by Terrill M. Moore, et al. for a POWER MANAGEMENT MODULE FOR USB DEVICES and is hereby incorporated by reference.

BACKGROUND OF THE INVENTION

1. Field of the Invention

The invention relates generally to universal serial bus (USB) devices and, more particularly, to USB devices that suspend and resume activities over the USB.

2. Background Information

Over the past 15 years, USB has emerged as the preferred, if not dominant, technology for interfacing personal computers (PCs) or other host systems with a wide variety of USB devices, such as, mass storage, smart phones, digital cameras, media players, modems, keyboards and the like. The devices of interest include multiple, independently controlled, functions, for example, a smart phone may include a camera, media player, and so forth. Users enjoy the convenience and simplicity of being able to attach the multi-function devices to the USB by, for example, plugging into USB ports on the PC or on hubs that, in turn, plug into the USB ports on the PC. Manufacturers and software developers also enjoy the benefits of having a single standard interface to support.

The USB generally operates under host control. The host utilizes class or custom function drivers that are associated with respective functions in the device to communicate with the functions and control transfers of data and requests for attention between the device functions and the host. The host operates in a known manner using the class or function drivers to, at various times as determined by the host, poll the device functions, as appropriate, and move pending data or requests from device hardware that is associated with the function to the host. The device functions determine that, for example, a data transfer to the host has occurred essentially by determining that the data moved from the hardware. The device function may also but not always receive a confirmation from the host. Similarly, the device function determines a data transfer or request from the host to the device has occurred when data are moved to hardware associated with the function.

If the host determines that the bus is essentially inactive, that is, the host determines that it has no data to move to the devices and that the devices have no data or requests to move to the host, the host may suspend one or more portions of the USB bus including the device. Prior to suspending, if the host wants to allow the device to request attention from the host, the host sends a standard command SET_FEATURE(RemoteWakeupEnable) to the device. If the host has no more work to be done, the host then similarly suspends. Later, when the host is ready to exchange is messages with the device, the host resumes one or more portions of the USB bus, including the device.

A given device noticing a suspended bus is required to suspend. Later, if the device needs attention, and if the host previously sent the SET_FEATURE(RemoteWakeupEnable) command, the device may send a "remote wakeup" signal to the host. However, the device is required to wait 3 milliseconds to confirm a suspend; and the host normally stops interrogating the device some time before it actually suspends the bus. If there are data pending to be moved, or written, to the host from one or more functions of the device and/or one or more functions require the attention of the host, the device may attempt to move the data and/or requests to the host during this interval after the host has initiated the suspend operation, but before the device recognizes the suspend. In this case, the device must suspend and then immediately request that the host resume its operations, to attempt to move the pending data and/or requests to the host.

A problem may arise if there are device functions that are not then supported by the host. If the host has never activated or has de-activated one or more of the class or function drivers for one or more functions of the multiple function device, the host will not respond to the device's attempts to move data or requests from the one or more functions. Consider, for example, a device that includes functions associated with push buttons or some other kind of independent behavior. The device function is not privy to whether or not there is an associated class or function driver active at the host. When, a device function autonomously discovers it requires attention from the host, for example, when one of the buttons is pushed, the function places a request for attention at an appropriate function endpoint at the device. If there is no associated class or function driver active on the host, however, the host will not become aware of and respond to the pending request. The request thus remains pending.

The device therefore cannot perform the transactions that prevent the device from suspending or remaining suspended. This creates a "deadlock" situation, in which the device responds to suspend requests by waking the host to handle the pending data and requests, the host again determines that the device has no data to transfer or no is pending requests for attention because there are no active host class or function drivers that allow the host to "see" the pending data or requests at the device, and the host again sends a suspend request, to which the device again responds by waking the host, and so forth. The device therefore remains in or continuously returns to a non-suspended mode, with the device operating at full power consumption, and also, repeatedly waking the host, which also must operate at full power consumption It is important to note that for USB low-speed, full-speed and high-speed devices, the suspend resume indications over the bus are all device-level operations. There is no standard way for the host to indicate that it is not using a function of a multi-function device; nor is there a way for the host to indicate that it is only interested in wake-up events from a particular subset of functions on a multi-function device.

SUMMARY OF THE INVENTION

The invention is a power management module and method of operating the module that controls the suspend operations of a multiple function device that is attached to the USB, after the associated device has received a suspend request from the host. After the device suspends automatically or is put in a suspend mode by the power management module, the power management module and method of operation determines independently for each function, essentially by scanning the status of the respective function endpoints, if the respective functions are in predetermined "indefinite", "locked" or "unlocked" states.

The states are defined essentially from the perspective of the device, based on perceived activities of the host as determined by the status of the function endpoints. The indefinite state is based on perceived host activities that signify that the function may not then be operational over the USB, and thus, that an associated host class or function driver may or may not then be active. The locked state is based on perceived host activities that indicate that a given function cannot then complete a data transfer to the host, that is, that the associated host class or function driver is most likely not then active. The unlocked state is based on perceived host activities that indicate that a given function may then complete a data transfer to the host, and thus, that the host class or function driver is then active. The module essentially maintains a state machine for each device function.

If the module or method classifies all of the respective device functions as either indefinite or locked, the module or method dictates that the device not request wakeup even if a given function has pending data or a request for attention from the host. If the module and method determines that at least one of the functions is in the unlocked state, the module or method dictates that the device request remote wakeup if data and/or requests for the host are pending at the endpoints of an unlocked function. The power module or method also assigns the unlocked functions with data or requests then pending to the locked state. If the device receives a suspend request in response to the resumed activity, the power management module or method checks the status of the endpoints of the respective functions to determine if any functions should be assigned to different states. If not, the module controls the device to suspend the device and remain suspended until host activities result in either one or more of the functions being assigned to the unlocked state and data or requests are then pending or the host actively wakes the device.

The controlling of the response of the device to the suspend request based on the states of the respective device functions, as determined by the status of function endpoints, avoids the device being deadlocked in or unnecessarily returned to a non-suspended operating mode. It ensures that the device is not prevented from suspending due to attempts to move pending data and/or requests to a host that will not then respond to the attempts.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
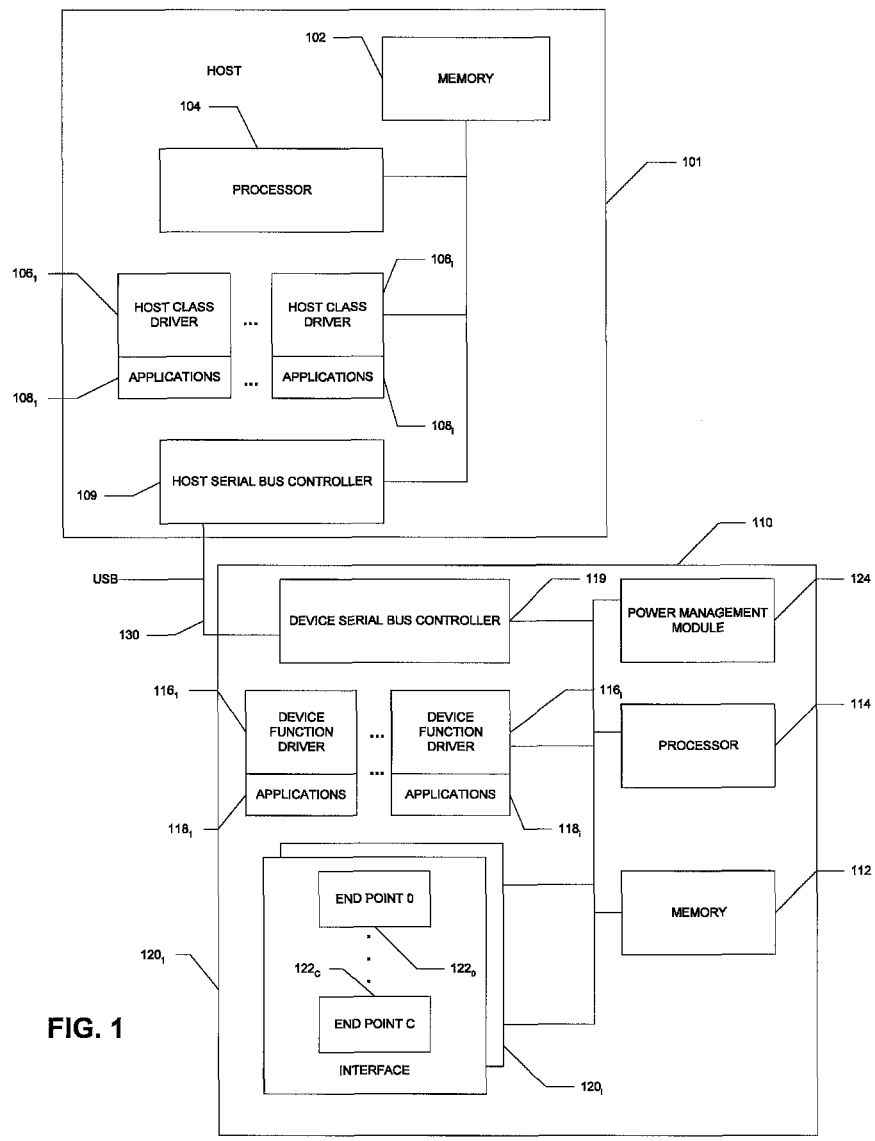
FIG. 1 is a functional block diagram of a system constructed in accordance with the invention.

Referring now to FIG. 1, a host 101 is connected to a universal serial bus (USB) 130 and communicates over the bus with an attached multiple function device 110. For ease of explanation, a single attached device is shown. The host and device include processors 104, 114, memory 102, 112 and serial bus controllers 109, 119 and other known components (not shown) that operate in known manners in accordance with known USB specifications.

Prior to communicating over the bus, the host and device perform, in a known manner, an enumeration operation in which a control channel with a device endpoint $122_0$ is established i.e., device buffer space is allocated, to exchange information between the host and device. The communications are established also between the host and the functions on the device. For a given function, the device also configures one or more interfaces $120_1, 120_2 \ldots 120_i$ and one or more associated device endpoints $122_1 \ldots 122_E$ to allow data and requests to be transferred from the function to the host and data, commands and requests to be transferred from the host to the function. The host similarly operates in a known manner to configure host interfaces and host endpoints (not shown) for the communications.

As part of the enumeration operation, the host determines, in a known manner based on an exchange of information with the device, the USB classes of the respective device functions and the appropriate host class or custom function drivers $106_1 \ldots 106_D$ and applications $108_1 \ldots 108_i$ to activate i.e., load or enable, in order to process communications directed to and received from the respective functions of the device. As is well known, the device similarly operates with respective device class or function drivers $116_i$ and associated applications $118_i$.

Well known lower level transport layers and drivers (not shown) operate at the host 101 and device 110 to facilitate transport of data and control information over the USB 130 in accordance with appropriate USB specifications. As is well understood, communications between the host and the device occur over the USB in "pipes," which are defined by the respective host endpoints (not shown) and device endpoints $122_{0-c}$. For example, a given function on the device will have at least one endpoint that is configured for sending data to the host, that is, an endpoint for an associated IN pipe. In addition, the function typically will have at least one associated endpoint configured for receiving data from the host, that is, an endpoint for an OUT pipe. As appropriate, a given function may have multiple endpoints configured for multiple IN and/or OUT pipes. The device endpoint 0 is configured as part of a control pipe, that is, the communication channel for the exchange of control information with the host. The endpoint 0 is common to all of the functions of the device, and commands sent over the control pipe to the device may be identified as class or function/vendor specific, as appropriate, and thus contain function interface and/or endpoint addresses.

As is also well known, for certain devices there may be selectable configurations that are compatible with different host operating systems. During enumeration, the host selects the configuration that is appropriate, and the enumeration continues accordingly. Certain selectable configurations may require configuration of certain but not all possible endpoints, while other selectable configurations may configure all of the endpoints.

After device enumeration is complete, the host 101 has enabled or loaded host class or function drivers $116_i$ and associated applications $118_i$ for all of the host-supported device functions and the device 110 has configured endpoints $122_{0-c}$ for all of its functions. The host and the device then communicate over the USB 130, to provide the host-supported device functions for the user. Notably, the host may not support every function of the device if, for example, a required class or function driver, such as a vendor specific class driver, is not then installed on or available to the host. Also, the host may de-activate i.e., unload or disable, certain class drivers and/or associated applications for various reasons, such as, for example, inactivity of a device function or because of a malfunction at the host or at the device. Thus, the host may, at any time, be unable to support various device functions. The respective device functions, however, may not be notified that the corresponding host class or function driver is not then active. Accordingly, device function drivers $116_i$ and applications $118_i$ continue to operate as if there are corresponding active host class or function drivers for the respective device functions.

When the host 101 determines that the USB 130 is essentially inactive, that is, when the host determines that there are no data to be sent, or moved, to the device by the host class drivers $106_i$ and there are no associated pending data or requests to be moved to the host from the host-supported device functions, the host may issue a suspend request to the device in order to reduce power consumption at the device and the host. When the device 110 receives the suspend request, the device must determine how to respond to the request. Notably, the suspend request is made to the device, and not to the individual functions of the device, and the host issues the suspend request based on the functions supported by active host class or function drivers having no pending data or requests. If there is no active host class or function driver for a given device function, the host operates as if the given function has no data to be moved to the host, regardless of what occurs at the device, since the host is not then aware of the function activity.

When a device receives a suspend request from the host, the power management module 124 associated with the device 110 controls how the device responds to the suspend request from the host 101. To do this, the power management module 124 assigns each function to one of three defined states by scanning the status, or states, of the associated endpoints, to determine if the conditions for the predetermined function states are met. The three defined states are indefinite, locked, and unlocked. The states are defined based on host activities, as perceived at the device, and essentially relate to the perceived ability of the device to then complete a transfer to the host.

In the indefinite state it cannot be determined at the device whether or not the associated host class or function driver is active. The function endpoints are thus scanned to determine from the status of the endpoints if the function is then established over the USB 130. The locked state is one in which the device perceives from the status of the endpoints that the function cannot then write or move data to the host. The unlocked state is one in which the device perceives from the status of the endpoints that the is function may then write, or move, data to the host.

Before discussing how the power management module 124 controls the device's response to the suspend request from the host, the definitions of the respective states used by the power management module are discussed in more detail. The power management module assigns states to the functions based on the conditions met, as determined by scanning, i.e., determining the status of, the respective function endpoints based on the host activities. The power management module thus scans the respective function endpoints including the control-channel endpoint, which is associated with every function, to determine from the status of the endpoints if the conditions for a different state are met by a given function at the time the device receives a suspend request.

The conditions for the indefinite state are: the given function is in start-up mode; or the function interface settings are being configured; or none of the function endpoints are then bound to pipes. For example, a given function will be classified as meeting the conditions for the indefinite state if the device received a SET_CONFIGURATION command for the function and the host has not yet directed any activities or class commands to the device endpoints associated with the given function.

More specifically, we have defined the indefinite state based on host activities as perceived by the device that indicate that it is not clear if the host has an associated active host class or function driver and/or application. Accordingly, it is not clear whether or not the host will respond to requests from the device to move to the host pending data and/or requests for host attention.

The condition for the unlocked state are: the device serial bus controller 119 has detected signaling directed to a function endpoint; or a class or vendor specific command that involves the associated device function is received; or a transaction is completed on any endpoint that is bound to a function endpoint; or a transfer is completed on any endpoint that is bound to a pipe of the function; or the host is issuing transactions to any of the endpoints associated with the function. (We refer to these conditions hereinafter collectively as the "Activity Indications".) For example, if the given endpoint is an OUT pipe endpoint for a given function and a transaction completes on the endpoint that is bound to the OUT pipe, the given function is determined to meet the conditions of the is unlocked state.

More specifically, we have defined the unlocked state based on host activities as perceived by the device that indicate that the host has not unloaded the host class or function driver and/or closed the associated application that correspond to the given function. Accordingly, it is expected that the host will at least respond to requests from the device to move data or requests for attention that are pending at a function endpoint.

The conditions for the locked state are: a class or vendor specific command is received that indicates that a class or function driver corresponding to the function is unloaded or deactivated at the host or an application associated with the function is closed or deactivated at the host; the device has received a communication indicating that the host has selected a configuration that does not include the function; or the device has received a suspend request while the function is in the indeterminate state; or the device has received a suspend request while the function is in the unlocked state, and the device needs attention from the host, but no Activity Indications have been received since the last resume.

More specifically, we have defined the locked state such that it is determined at the device to be either known or at least probable that the associated class or function driver has been unloaded at the host and/or the associated application closed at the host. Thus, the conditions exist for the device to suspend, regardless of whether or not the function has pending data for the host, because the power management module has determined that it is more likely then not that the host will not respond to requests from the function.

Figure 2:
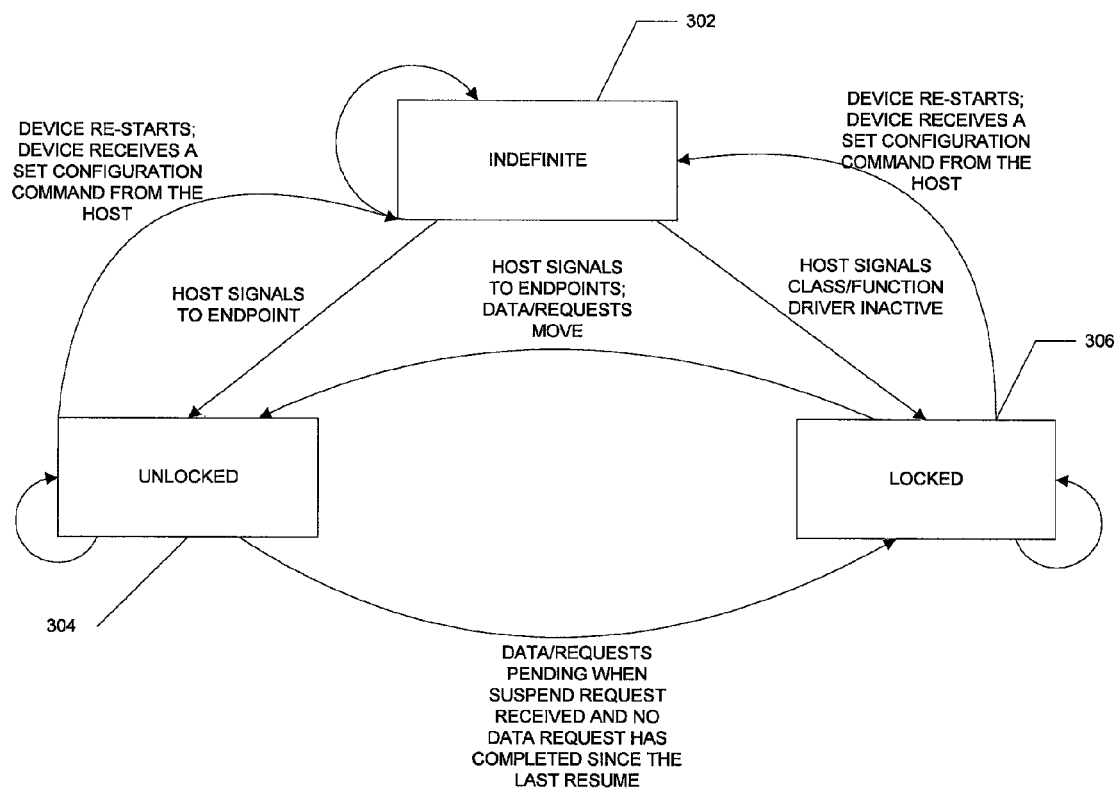
FIG. 2 is flowchart of a state machine maintained by a power management module of the system of FIG. 1.

Referring now to FIG. 2, the power management module 124 maintains a state machine for each device function and, at the times that the device receives the suspend requests, determines if the state of the function should change. The state machine consists of the three defined states, 302, 304, 306.

A function that is in the indefinite state 302 remains in the indefinite state until the status of the function endpoints or the receipt of a command makes clear that the host has an active or an inactive associated host class or function driver and/or application. For example, the function remains in the indefinite state until the host signals to the function endpoints and the state then changes to unlocked, or until a resume/suspend cycle with no Activity Indications makes it clear that the function driver is inactive, i.e., has been unloaded or disabled, and the function state changes to locked.

A function that is in the unlocked state 304 remains in the unlocked state as long as the host moves pending data or requests or, if no data or requests are pending, the host signals to the function endpoints or sends over the control endpoint 0 a class specific or vendor specific command that includes addresses for the function interface or endpoints. The power management module changes the state of the function to locked if data or requests are pending at the time of the receipt of a suspend request and no Activity Indications have been received since the last resume. The power management module changes the state of the function to indefinite if the device re-starts, if the device receives a SET_CONFIGURATION command from the host, or if the host uses any of a number of well-known methods to return the device to the USB-defined Default or Address state, as defined in section 9.1.2 of the USB 2.0 specification.

A function that is in the locked state 306 remains in the locked state until the host moves pending data and requests or, if no data or requests are pending, the host signals the function endpoints and/or sends over the control endpoint 0 a class specific or vendor specific command that includes addresses for the function interface or endpoints, and the function state changes to unlocked. The power management module changes the state of the function to indefinite if the device re-starts or if the device receives a SET_CONFIGURATION command from the host, or if the host uses any of a number of well-known methods to return the device to the USB-defined Default or Address state, as defined in section 9.1.2 of the USB 2.0 specification.

Figure 3:
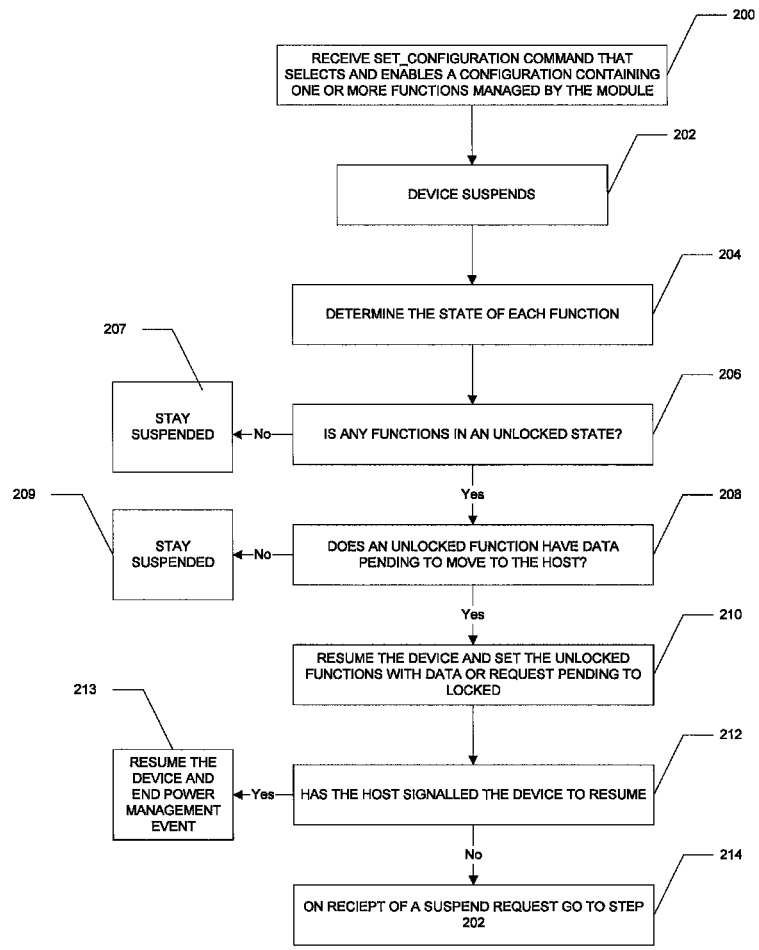
FIG. 3 is a flowchart of further operations of the power management module of the system of FIG. 1.

Referring now also to FIG. 3, the power management module 124 performs the following operations based on the states of the respective functions, as determined by scanning the function endpoints after a suspend request is received. In step 200 the device receives from the host a SET_CONFIGURATION command that selects and enables a configuration containing one or more functions being manage by the module. Upon receipt of such command, the power module sets the function states to a default state, for example, the unlocked state, since it is assumed that the functions are supported by the host. In step 202, the device suspends its operations, in response to a USB bus suspend event detected by the Device Serial Bus Controller 119. The power management module must then determine if the device remains suspended or resumes with a remote wake-up of the host.

The power management module 124 determines the state of each function. Step 204. For a given function the power management module scans the associated function endpoints that is, determines the status of the endpoints, to determine if the state of the function should change. Thus, the module determines, independently for each function, if the conditions of a different state conditions are met, as discussed above with reference to FIG. 2. If all of the device functions are then in the indefinite and locked states, the power management module controls the device such that the device remains suspended, even if data or requests are pending at one or more of the functions. Steps 206, 207.

If one or more of the functions are in the unlocked state, the power management module determines whether data or requests are pending at the unlocked functions. The power management module then allows the device to perform a remote wake up of the host, and thus, the device function to resume. The power management module also changes the states of the respective unlocked functions with pending data or requests to locked. Steps 206, 208, 210. If no data or requests are pending from a function in the unlocked state, the power management module 124 has the device remain suspended. Step 209.

If the device receives a suspend request in response to the resumed activity, Step 214, the device again suspends either automatically or under the control of the power management module. Step 202. The power management module again scans the function endpoints to determine if the states of the functions should change. Step 204. However, even if the data and requests for attention continue to remain pending, the functions are in the locked state and the power management module determines that the functions should remain in the locked state. Accordingly, the device remains suspended. Steps 204, 206, 207. The power management module 124 thus prevents the device from becoming is deadlocked or entering an endless loop of continuously resuming each time the device receives a suspend request from the host because of the pending data and requests for attention at functions that are not then supported by the host. Thus, the device, when operating in accordance with the dictates of the power management module or method, appropriately remains suspended and reduces its power consumption until the host signals that it is again ready to actively communicate with the device.

When the host signals for activity with the device, for example, in response to user activity to wake up the system, the device resumes and the power management module ends the power management event. The power management module then awaits the next power management event trigger, i.e., the next suspend command from the host, to again control the suspend responses of the device. Steps 212, 213.

Instead of repeatedly scanning the endpoints, the power management module may utilize an endpoint status register (not shown) in which flags are set to indicate the status of the respective endpoints. For example, a flag may be set if the endpoint receives signaling from the host. The power management module can then scan the status of the endpoints by checking the register. As appropriate, separate registers may be used for the endpoints associated with the respective device functions. The signaling over the control channel or endpoint 0, however, must be determined based on the type of command received, i.e., a standard command or a class/vendor specific command with function-related addressing information associated with the command. The register may include multiple entries for the control endpoint 0, since the endpoint is common to all functions, and flags are then set based on the address information. Alternatively, flags could be set for other endpoints associated with the respective functions when the class or vendor specific commands are received, since the signaling indicates that the associated host class or function driver is then active at the host. Again, alternatively, these functions may be performed in software by maintaining appropriate flags. The software-based approach is less efficient, but can be implemented without modification to existing device serial bus controller hardware.

The power management module may rely on host activities that occurred at the endpoints after the end of an earlier power management event trigger, that is, since the device resumed based on host activity signals. Alternatively, or in addition, the power management module may examine host activities that occurred at the endpoints since the last configuration of the respective functions. As discussed, the power management module scans the endpoints, or the register as appropriate, to determine from the status of the endpoints whether or not, from the perspective of the device, the host class or function drivers are then active for the respective functions.

The inclusion of the locked and indefinite states in the state machines is for efficiency. If a function is in an indefinite state, the power management module must check every associated endpoint to determine if the state should be changed to unlocked, or to locked. However, for a function in the locked state, the status of all function endpoints and the control channel endpoint may but need not be considered. If, for example, data are pending at the time of the suspend only the OUT endpoints that have the data pending need be scanned after the receipt of the next suspend request. Further, if no data are pending, fewer than all of the endpoints may require scanning since host signaling at one of the endpoints indicates that the function state should be changed to unlocked. Similarly, if the function is in the unlocked state, the power management may scan fewer than all of the endpoints if host signaling is detected at any one of the function endpoints. The host signaling may be, for example, polling or moving data from a function IN endpoint, or moving data or commands to an OUT endpoint, or receiving class or vendor specific commands directed to the function interface or endpoints over the control endpoint 0.

While the use of the three states allows the power management module to scan fewer endpoints of functions that are in the locked state or unlocked state, as opposed to the indefinite state, the power management module may instead operate with only two states in the state machines, namely, locked and unlocked. The power management modules then scans all endpoints of the locked functions each time the device receives a suspend request to determine if any function should change state.

The power management module and/or the state machines may be implemented in hardware, firmware and/or software. The power management module may include one or more processors and/or utilize the device processor 114. The device processor 114 may consist of multiple communicating processors.

Notably, if the host does not send a SET_FEATURE(RemoteWakeupEnable) command prior to suspending the device, the power manager cannot allow the device to signal remote wakeup to the host during the suspend cycle. However, the power manager should still track the state of each function, because the host may subsequently resume the device and then suspend it after sending the SET_FEATURE (RemoteWakeupEnable) command. Alternately, in this situation the power manger may set the state of each tracked function to unlocked or indefinite.

What is claimed is:

1. A method of managing power of a multi-function device connected to a Universal Serial Bus (USB), comprising:
   suspending the device in response to receipt of a request to suspend from a host connected to the USB;
   assigning a state to each function of the device, the state selected from a group consisting of indefinite, locked and unlocked states;
   allowing the device to resume if there is data or a request for host attention pending at a given function that has a status in the unlocked state and re-assigning the given function to the locked state; and
   otherwise maintaining suspension of the device even if data is pending for any function in the locked state.

2. The method of claim 1 further comprising:
   assigning the given function to the indefinite state if, based on host signaling activities at one or more endpoints associated with the given function, the device determines that the given function is not then operational over the USB;
   assigning the given function to the locked state if, based on host signaling activities at any of the endpoints associated with the given function, the device determines that the given function cannot then be used to complete a write to the host; and
   assigning the status of the given function to the unlocked state if, based on host signaling activities at any of the endpoints associated with the given function, the device determines that the given function can then be used to write to the host.

3. The method of claim 2 wherein assigning the given function to the indefinite state further includes the device determining any of:
   the device is in a starting up mode,
   an interface associated with the given function is being configured, and
   none of the endpoints associated with the given function is then bound to a pipe.

4. The method of claim 3 wherein assigning the given function to the locked state further includes the device determining any of:
   the device has received a class or vendor specific command indicating that an associated driver at the host is unloaded or an associated application at the host is closed;
   the device has received a communication indicating that the host has selected a configuration that does not include the given function; and
   the device has resumed from either a device controlled suspension or a host requested suspension without either receiving a class or vendor specific command targeting any interface or endpoint associated with the given function, and wherein no transfer or transaction is completed on any of the endpoints associated with the given function.

5. The method of claim 3 wherein assigning the given function to the unlocked state further includes the device determining any of:
   a serial bus controller included in the device detects signaling directed to any of the endpoints associated with the given function,
   a command is received that involves the given function,
   a transaction is completed on any endpoint associated with the given function, and
   a transfer is completed on any endpoint associated with the given function.

6. The method of claim 4 further comprising determining that the host is not issuing a transaction to any of the endpoints associated with the given function.

7. The method of claim 5 further comprising determining that the host is issuing one or more transactions to any of the endpoints associated with the function.

8. A method of managing power of a multi-function device connected to a Universal Serial Bus (USB), comprising:
   suspending the device in response to receipt of a request to suspend from a host connected to the USB;
   assigning a state to each function of the device, the state selected from a group consisting of indefinite, locked and unlocked states;
   allowing the device to resume if there is data or a request for host attention pending at a given function that has a status in the unlocked state and re-assigning the given function to the locked state; and
   otherwise maintaining suspension of the device even if data is pending for any function having a status in the locked state.

9. The method of claim 8 further comprising:
   assigning the given function to the locked state if, based on host signaling activities at one or more endpoints associated with the given function, the device determines that the given function cannot then be used to complete a write to the host or the given function is not then operational over the USB; and assigning the status of the given function to the unlocked state if based on host signaling activities at any of the endpoints associated with the given function, the device determines that the given function can then be used to write to the host.

10. The method of claim 9 wherein assigning the given function to the locked state further includes the device determining any of:
the device is in a starting up mode,
an interface associated with the given function is being configured, and
none of the endpoints associated with the given function is then bound to a pipe.

11. The method of claim 10 wherein assigning the given function to the unlocked state further includes the device determining any of:
the device has received a class or vendor specific command indicating that an associated driver at the host is unloaded or an associated application at the host is closed;
the device has received a communication indicating that the host has selected a configuration that does not include the given function; and
the device has resumed from either a device controlled suspension or a host requested suspension without either receiving a class or vendor specific command targeting any interface or endpoint of the given function, and wherein no transfer is completed on any endpoint associated with the given function.

12. The method of claim 11 further comprising determining that the host is not issuing transactions to any of the endpoints associated with the given function.

13. A system comprising: a multi-function device in communication with a host, the device including one or more processors executing a power management module configured to
suspend the device,
scan one or more endpoints of each function,
assign a state to each function of the device, the state selected from a group consisting of a locked state and an unlocked state that is associated with a perceived status of an associated host class or function driver based on a result from scanning the endpoints of each respective function,
allow the device to resume if there is data or a request for host attention pending at a given function that has a status in the unlocked state and assign the given function to the locked state; and
otherwise maintain the suspension of the device even if there is data pending for any function having a status in the locked state.

14. The system of claim 13 wherein the power management module is further configured to:
assign the given function to the locked state if, based on host signaling activities at any endpoints associated with the given function, the device determines that the given function cannot then be used to complete a write to the host; and
assign the given function to the unlocked state if, based on host signaling activities at any of the endpoints associated with the given function, the device determines that the given function can then be used to write to the host.

15. The system of claim 14 wherein the power management module is further configured to assign the given function to an indefinite state if, based on host signaling activities at any of the endpoints associated with the given function, the device determines the given function is not then operational to communicate with the host.

16. The system of claim 15 wherein assigning the given function to the indefinite state further includes the device determining any of:
the device is in a starting up mode,
an interface associated with the given function is being configured, and
none of the endpoints associated with the given function is then bound to a pipe.

17. The system of claim 16 wherein assigning the given function to the locked state further includes the device determining any of:
the device has received a communication indicating that the host has selected a configuration that does not include the given function; and
the device has resumed from either a device controlled suspension or a host requested suspension without either receiving a class or vendor specific command targeting any interface or endpoint associated with the given function, wherein no transfer is completed on any endpoint associated with the given function.

18. The system of claim 17 wherein assigning the given function to the unlocked state further includes the device determining any of:
a serial bus controller included in the device detects signaling directed to any endpoint associated with the given function,
a command is received that involves the given function,
a transaction or transfer is completed on any endpoint associated with the given function.

19. The system of claim 14 wherein the power management module is further configured to scan one or more endpoints associated with each function assigned to the locked state to which any host signaling is directed and re-assign the state to the respective function from the locked state to the unlocked state.

20. The system of claim 17 further including determining that the host is not issuing a transaction to any of the endpoints associated with the given function.

21. The system of claim 18 further including determining that the host is issuing one or more transactions to any of the endpoints associated with the given function.

\* \* \* \* \*

UNITED STATES PATENT AND TRADEMARK OFFICE
CERTIFICATE OF CORRECTION

PATENT NO. : 9,170,634 B2
APPLICATION NO. : 13/537920
DATED : October 27, 2015
INVENTOR(S) : Terrill M. Moore et al.

Page 1 of 2

It is certified that error appears in the above-identified patent and that said Letters Patent is hereby corrected as shown below:

On the Title Page, Item (57)
In the Abstract:
Amend the Abstract as shown below:
A system and method of managing power of a multi-function USB device suspends the device in response to receipt of a request to suspend from a USB host; assigns respective device functions to indefinite, locked or unlocked states; allows the device to resume if there are data or requests for host attention pending at a given function that is in the unlocked state and assigns the given function to the locked state; and otherwise maintains the suspension even if there are data pending at one or more of the functions that are in the locked state.

In the Specification:
Col. 1, line 58 should read:
the host is ready to exchange messages with the device, the Col. 2, line 32 should read:
device has no data to transfer or no pending requests for Col. 5, line 42 should read:
status of the endpoints that the function may then write, or Col. 6, line 19 should read:
ditions of the unlocked state.

Col. 7, line 32 should read:
taining one or more functions being managed by the module.

Col. 8, line 8 should read:
thus prevents the device from becoming deadlocked or Signed and Sealed this
Twenty-third Day of February, 2016

Michelle K. Lee
*Director of the United States Patent and Trademark Office*

CERTIFICATE OF CORRECTION (continued)
U.S. Pat. No. 9,170,634 B2

In the Claims:
Claim 9, Col. 11, line 2 should read:
state if, based on host signaling activities at any of the Claim 14, Col. 11, line 55 should read:
host signaling activities at any endpoint associated with Claim 19, Col. 12, line 46 should read:
which any host signaling is directed and re-assign the state of